(12) United States Patent
Knott et al.

(10) Patent No.: US 9,257,892 B2
(45) Date of Patent: Feb. 9, 2016

(54) METHOD AND DEVICE FOR CURRENT DRIVEN ELECTRIC ENERGY CONVERSION

(75) Inventors: Arnold Knott, Gentofte (DK); Michael A. E. Andersen, Helsinge (DE)

(73) Assignee: Danmarks Tekniske Universitet, Lyngby (DK)

( * ) Notice: Subject to any disclaimer, the term of this patent is extended or adjusted under 35 U.S.C. 154(b) by 393 days.

(21) Appl. No.: 13/825,105

(22) PCT Filed: Sep. 20, 2011

(86) PCT No.: PCT/DK2011/050353
§ 371 (c)(1),
(2), (4) Date: Jun. 11, 2013

(87) PCT Pub. No.: WO2012/037941
PCT Pub. Date: Mar. 29, 2012

(65) Prior Publication Data
US 2013/0249523 A1    Sep. 26, 2013

Related U.S. Application Data

(60) Provisional application No. 61/384,434, filed on Sep. 20, 2010.

(30) Foreign Application Priority Data

Sep. 20, 2010  (EP) .................................... 10177611

(51) Int. Cl.
*G05F 1/10*     (2006.01)
*H02M 1/00*    (2007.01)
(Continued)

(52) U.S. Cl.
CPC ............... *H02M 1/00* (2013.01); *H02M 3/155* (2013.01); *H02M 3/158* (2013.01); *H02M 7/48* (2013.01);
(Continued)

(58) Field of Classification Search
CPC ............ G05F 1/10; G05F 1/46; G05F 1/565; G05F 1/569
USPC .......................... 323/222, 225, 268, 271, 282
See application file for complete search history.

(56) References Cited

U.S. PATENT DOCUMENTS 4,661,758 A    4/1987   Whittaker
4,695,785 A    9/1987   Mieth et al.
(Continued)

FOREIGN PATENT DOCUMENTS

DE    10 2005 030 907 A1    1/2007
EP         1 076 411 A1    2/2001
(Continued)

OTHER PUBLICATIONS

Wolfs, Peter J. "A Current-Sourced DC-DC Converter Derived via the Duality Principle from the Half-Bridge Converter" IEEE Transactions on Industrial Electronics, Feb. 1993, pp. 139-144, vol. 40, No. 1.

(Continued)

*Primary Examiner* — Matthew Nguyen
(74) *Attorney, Agent, or Firm* — Knobbe Martens Olson & Bear LLP

(57) ABSTRACT

Device comprising an electric power converter circuit for converting electric energy. The converter circuit comprises a switch arrangement with two or more controllable electric switches connected in a switching configuration and controlled so as to provide a current drive of electric energy from an associated electric source connected to a set of input terminals. This is obtained by the two or more electric switches being connected and controlled to short-circuit the input terminals during a part of a switching period. Further, a low pass filter with a capacitor and an inductor are provided to low pass the output from the switch arrangement and designed such that a high impedance at a frequency range below the switching frequency is obtained, seen from the output terminals. Switches implemented by normally-on-devices are preferred, e.g. in the form of a JFET. The converter circuit may be in different configurations such as half bridge buck, full bridge buck, half bridge boost, or full bridge boost. A current driven conversion is advantageous for high efficient energy conversion from current sources such as solar cells or where a voltage source is connected through long cables, e.g. powerline cables for long distance transmission of electric energy. In many applications the total size of filter components (capacitors and inductors) can be reduced compared to voltage driven topologies. One application is an audio amplifier arranged to drive a loudspeaker.

19 Claims, 5 Drawing Sheets

(51) Int. Cl.
    *H02M 3/155*     (2006.01)
    *H02M 3/158*     (2006.01)
    *H02M 7/48*     (2007.01)
    *G05F 1/565*     (2006.01)
    *G05F 1/46*     (2006.01)

(52) U.S. Cl.
    CPC . *G05F 1/46* (2013.01); *G05F 1/565* (2013.01); *H02M 2001/0087* (2013.01); *H02M 2007/4815* (2013.01); *Y02B 70/1441* (2013.01)

(56) References Cited

U.S. PATENT DOCUMENTS

| | | |
|---|---|---|
| 5,397,976 A | 3/1995 | Madden et al. |
| 5,504,667 A | 4/1996 | Tanaka et al. |
| 5,714,871 A | 2/1998 | Endou |
| 5,834,977 A | 11/1998 | Maehara et al. |
| 2005/0173615 A1 | 8/2005 | Hontele |
| 2005/0243579 A1 | 11/2005 | Jang et al. |
| 2006/0055446 A1 | 3/2006 | Tai et al. |
| 2009/0310385 A1* | 12/2009 | Maksimovic et al. ....... 363/21.1 |
| 2009/0322300 A1* | 12/2009 | Melanson et al. ............ 323/284 |
| 2010/0228089 A1 | 9/2010 | Hoffman et al. |

FOREIGN PATENT DOCUMENTS

| | | |
|---|---|---|
| EP | 1 928 077 A2 | 6/2008 |
| EP | 2 109 025 A2 | 10/2009 |
| EP | 2 136 460 A2 | 12/2009 |
| EP | 2 166 638 A2 | 3/2010 |
| EP | 2 173 024 A2 | 4/2010 |
| EP | 2 286 949 A1 | 2/2011 |
| GB | 2 090 084 A | 6/1982 |
| JP | 07-028538 | 1/1995 |
| JP | 08-297517 | 11/1996 |
| WO | WO 2010/034785 A1 | 4/2010 |

OTHER PUBLICATIONS

International Search Report of PCT/DK2011/050353, Jan. 29, 2013.

* cited by examiner

METHOD AND DEVICE FOR CURRENT DRIVEN ELECTRIC ENERGY CONVERSION

CROSS REFERENCE TO RELATED APPLICATIONS

This application is a U.S. National Phase Application of PCT International Application Number PCT/DK2011/050353, filed on Sep. 20, 2011, designating the United States of America and published in the English language, which is an International Application of and claims the benefit of priority to European Patent Application No. 10177611.0, filed on Sep. 20, 2010, and U.S. Provisional Application No. 61/384,434, filed on Sep. 20, 2010. The disclosures of the above-referenced applications are hereby expressly incorporated by reference in their entireties.

FIELD OF THE INVENTION

The invention relates to the field of electric power converters, i.e. electric power stages for converting electric energy from an electric source into a regulated current or voltage, e.g. DC-DC converters. Further, the invention relates to the field of audio amplifiers for driving a loudspeaker.

BACKGROUND OF THE INVENTION

Traditional power stages of power converters are driven by one or more DC or AC voltage sources. Thus, such converters for providing a regulated electric output are typically based on switching circuits with electric switches configured in a voltage driven topology. Such swithcing circuits are used in many applications, e.g. switch mode power supplies, and they are often implemented with electric switches in the form of MOSFETs.

Normally, power stages convert the input voltage to a regulated output voltage. However, in a few cases, the input voltage is converted into a regulated output current. This is used in some audio power amplifiers which can be designed with a current output to drive a loudspeaker.

However, solar cells, i.e. electric sources converting light into electric energy, can be regarded as current sources. This applies also to AC powerlines, i.e. transport of electric energy in long cables, or in general to applications where an electric source is connected to a converter or a load via cables that can be considered to be long due to the combination of a high AC frequency, a high current level, and long connecting cables. Thus, in practice electric sources in the form of current sources are not that rare, even though typical converters are designed based on the assumption that the electric source can be considered to be a voltage source.

Typically, circuits for converting electric energy from a solar cell, i.e. a current source are configured to receive power from a voltage source, and thus a capacitor across the input terminals is required to initially convert the current from the solar cell to a voltage which is then used to drive the converter circuit. The required extra capacitor increases costs, comprises reliability and lifetime, and due to the required capacitance, it occupies a significant space compared to the other components needed to implement the switching circuit. Finally, the extra capacitor reduces the total power conversion efficiency that can be obtained.

SUMMARY OF THE INVENTION

Therefore, there is a need for a device and a method that provides an energy efficient conversion of electric power from a current source to a suitable voltage or current to drive a load. Still, the device should be suited for implementation as miniature applications, i.e. where the necessary electric components for the energy conversion only occupy a limited space.

In a first aspect, the invention provides a device comprising an electric power converter circuit arranged to convert electric energy between a set of input terminals and a set of output terminals, the electric power converter circuit comprising
- a switch arrangement comprising at least first and second controllable electric switches connected so as to allow direct short-circuiting of the input terminals,
- a control circuit arranged to control the switch arrangement according to a switching scheme, wherein the control circuit is arranged to turn on the first and second electric switches so as to directly short-circuit the input terminals during a part of a switching period, and
- a low pass filter comprising at least a capacitor and an inductor arranged to low pass filter an output from the switch arrangement and connected so as to provide a high impedance seen from the output terminals at a frequency range below a switching frequency.

Such a device provides an efficient conversion of electric energy from an electric current source, since such a current source can be directly coupled to the input terminals without the need for an extra capacitor. Thus, a large extra capacitor can be eliminated in case of a current source, e.g. solar cell or other electric source which can be considered as a current source, such as a current or voltage source connected with cables that are long, taking into account AC frequency, current level, and length of the connecting cables.

For a practical example it has furthermore been shown that the inductor and capacitor required to implement the switching circuit can be significantly reduced in volume compared to the corresponding inductor and capacitor required for a voltage driven converter, since especially the required inductance for the inductor causes the physical dimensions of the component to be significantly smaller. Altogether this means that the device is highly suited as a device for application requiring miniature components, especially solar cell devices, such as portable solar cell driven devices. The high efficiency provides efficient power to an audio device which can therefore be driven by a smaller solar cell and provide the same acoustic output. The electric power converter circuit can in a single power stage convert e.g. electric power from a solar cell into such as 5 V DC or 12 V DC for portable applications or into 230 V AC for direct solar cell power conversion to feed normal electric household applicances using only one single power converter stage with few and small components.

The high conversion efficiency can also be used in powerline converters where electric energy in the form of a high AC current is carried via long wires and thus, in spite of a frequency of 50 Hz or 60 Hz, can be considered as a current source. For conversion of such electric energy, a higher efficiency can be obtained using the current driving principle according to the invention utilizing the fact that the electric source is a current source. Furthermore, large and expensive electrolytic capacitors with low reliability and lifetime at the input of traditional power converters can be eliminated. The liquid in electrolytic capacitors dry out and thus reduces its lifetime, and especially high temperatures accelerate the drying process. This is why such capacitors are avoided e.g. in avionic applications. The device according to the invention can provide a long lifetime in such high temperature applications due to the elimination for a large input capacitor.

The efficient conversion of electric energy from a current source is provided by a topology and an energy conversion switching scheme which serve to directly short-circuit the input terminals during a part of a switching period in combination with a low pass filter with components arranged such that, at a frequency range below the switching frequency, the output impedance seen from the output terminals is high. Most importantly, it is understood that the output impedance is high in the bandwidth where the power conversion is to take place. By "high impedance" is here understood as significantly higher than an impedance of the associated load to be connected to the output terminals, preferably at least a factor of 100 higher, more preferably at least a factor of 1000 higher, more preferably at least a factor of 10000 higher.

Preferably, the electric power converter circuit is arranged to provide a low impedance, seen from the input terminals, at a frequency range below the switching frequency. Again, the most important bandwidth is the bandwidth where the power conversion is to take place. Thus, especially the low pass filter components are selected and connected in a manner to provide this, combined with selection of a switching scheme that will result in a low impedance seen from an electric source connected directly to the input terminals. In this context, "low impedance" is understood to be significantly lower than an impedance of an associated electric source to be connected to the input terminals, preferably at least a factor of 100 lower, more preferably at least a factor of 1000 lower, more preferably at least a factor of 10000 lower.

In preferred embodiments, the electric power converter circuit provides an input impedance seen from the input terminals which is significantly higher than an output impedance seen from the output terminals. Preferably, the input impedance is at least a factor of 100 higher than the output impedance, more preferably at least a factor of 1000 higher, more preferably at least a factor of 10000 higher.

By direct short-circuiting is meant that the electric switch(es) is connected directly across the input terminals, i.e. without any significant intermediate circuit element other than a conducting element in the form of a conducting path on a PCB or a wire or the like which does not introduce any significant electrical impedance. This short-circuiting of the input terminals and thus short-circuiting of a connected electric source is in contrast to a voltage driven converter which usually has its electric switch(es) connected and controlled such that the associated electric source is open-circuited during a part of a switching cycle, and especially in short-circuiting is completely avoided. This is either done in voltage driven topologies by the electric switch(es) being connected so that this is impossible, or in cases where e.g. two electric switches are connected such that short-circuiting of the input terminals in principle is possible, the control circuit controlling the electric switches is arranged to ensure that such short-circuiting does never happen. The implementation of the control circuit providing the energy converting switching scheme is known by the skilled person.

In some embodiments, the first and second electric switches are connected in series across the input terminals. The control circuit is then arranged to turn on both electric switches simultaneously, so as to directly short-circuit the input terminals in a part of the switching period.

In preferred embodiments, the inductor of the low pass filter is arranged so in relation to the output terminals to be in series connection with the associated load upon connection of said load to the output terminals.

The electric energy converter circuit may be arranged to convert electric energy according to different strategies: either to up-convert a voltage level at the input terminals into a higher voltage level at the output terminals, or to up-convert a current level at the input terminals into a higher current level at the output terminals.

The switching configuration may comprise two individually controllable electric switches, or such as three or four individually controllable electric switches, depending on the selected configuration or topology. One, two, three or more electric switches may be involved in the direct short-circuiting of the input terminals during a part of the switching period.

The electric power converter circuit may comprise two or more sets of input terminals arranged for connection of respective associated electric sources, e.g. three input terminal sets, one for each electric phase in a three-phase electric system. E.g. such configuration of input terminals may be used for connection of two current sources (e.g. of equal current) to provide a conversion into a symmetrical output voltage or current across the output terminals. Especially, the switch arrangement may comprise, for each of the two or more sets of input terminals, at least one electric switch connected so as to allow direct short-circuiting of the set of input terminals.

The electric switches may be types of electric switches arranged to provide a bi-directional voltage blocking. Also, it is preferred that the first and second electric switches are individually controllable electric switches, so as to be able to turn them on individually. Especially, the electric switches may be implemented by a transistor being one of: a Junction Field Effect Transistor (JFET), a Metal-Oxide-Semiconductor Field Effect Transistor (MOSFET), a MODulation-doped Field Effect Transistor (MODFET), a MEtal-Semiconductor Field Effect Transistor (MESFET), a Bipolar Junction Transistor (BJT), an Insulated Gate Bipolar junction Transistor (IGBT), and a triac. Preferably, the transistor(s) used for the electric switch(es) is/are normally-on-device(s). Such electric switch is advantageous for use in a current driven switching circuit, because it allows the current sources to freewheel as long as the control circuit is not turned "on". By normally-on-device is understood a switch component which is normally "on", without application of any input control voltage. In preferred embodiments where the switch(es) are connected to short-circuit the input terminals, this means that the input terminals will be short-circuited at instances where there is no control signal on the switches, which is advantageous if a current source is connected to the input terminals.

Junction Field Effect Transistors (JFETs) are normally-on-devices and are advantageous for a current driven configuration since it does not have a built-in diode which the normally used MOSFETs have. This diode will significantly decrease conversion efficiency in a current configuration since the diode will lead to conduction losses during "on" time of the MOSFET. This is avoided with JFETs.

The electric power converter circuit may be configured to provide a current-to-voltage conversion or a current-to-current conversion between the input and output terminals. A current-to-current conversion means, that the input terminals are connected to current sources and the output current is set according to a given reference independent on the load connected to the output terminals. In current to voltage conversion, the input terminals are connected to current sources and the output voltage is following a reference signal independent on the connected load. In both configurations the output current or voltage may be controlled by feedback or feedforward.

A current-to-current conversion design may be preferred e.g. for powering of an audio amplifier, since in this case the load is typically an electromagnetic loudspeaker which produces a force F which is proportional with the supplied current I as: $F=B \cdot I \cdot l$, where l is the length of the electric conductor in which I flows, and where the conductor is arranged in a magnetic field with magnetic flux density B. Thus, for such transducer a regulated current can be regarded as the most appropriate. Another example for current-to-current conversion is a battery charger operating from a current source, e.g. solar cell. Batteries are charged by a constant current which is provided from a current-to-current configuration. The reverse connection having a battery charger, i.e. a current source, at the input can turn this battery charger into either a different current source by current-to-current conversion or a voltage source by current-to-voltage conversion. For other applications, a current-to-voltage conversion design is desirable.

The switching configuration may be a topology being analogue to one of: half bridge or full bridge buck, half bridge or full bridge boost, flyback, two-switch flyback, push-pull, Single-Ended Primary-Inductor Converter (SEPIC), Cuk converter, such as known to the person skilled in the art.

The switching scheme may be selected as being one of: Pulse Width Modulation (PWM), Pulse Density Modulation (PDM), Pulse Code Modulation, Frequency Modulation, and Phase Modulation, such as known to the person skilled in the art.

Especially, the device may comprise a current source connected to the input terminals, such as one of: a solar cell, a re-chargeable electric energy source, and an electric power-line.

The device may comprise an overload protection detector arranged to detect an overload of at least one element of the electric power converter circuit, and to generate an overload signal accordingly. Especially, the overload protection circuit comprises a circuit arranged to detect a voltage across at least one of the electric switches of the switch arrangement, and to generate the overload signal accordingly. Due to the current driving principle, it is possible to implement an overload protection detection of the power converter which is significantly facilitated compared to the detection required in a voltage driven configuration. Overload detection in a voltage driven configuration requires a bidirectional current sensing in the power path, which is complex and expensive since it requires use of power components. In the current driven topology, simple small signal components can be used to detect a voltage across the electric switches, e.g. standard cheap components like a normal comparator circuit based on an op-amp can be used for this voltage detection and still provide a fast reacting overload detector.

As mentioned, the device is suitable within a large range of applications. Selected types of devices are: a switch-mode power supply, an audio device such as an audio amplifier, a DC-DC converter, a DC-AC converter, an AC-DC converter, a solar cell converter, a Light Emitting Diode driver, battery charger, a backlight converter, a point of load converter.

In one embodiment, the device is an audio amplifier comprising a set of audio input terminals arranged to receive an audio input signal and to drive an associated loudspeaker connected to the output terminals according to said audio input signal.

In typical embodiments, switching frequency of the switching circuit is in the range of such as 10 kHz up to such as 10 MHz, more typically in the range 100 kHz to 1 MHz.

Embodiments of the device can be designed with switching circuits which are either isolated and non-isolated, i.e. similar classes of converters as known for voltage driven converters.

In a second aspect, the invention provides a method for converting electric energy between a set of input terminals and a set of output terminals, the method comprising providing a switch arrangement comprising first and second controllable electric switches connected so as to allow direct short-circuiting of the input signals, switching the switch arrangement according to a switching scheme so as to directly short-circuit the input terminals during a part of a switching period, and low pass filtering an output from the switch arrangement by means of at least a capacitor and an inductor arranged so as to provide a high impedance seen from the output terminals at a frequency range below the switching frequency.

It is appreciated that the same advantages and equivalent embodiments apply for the second aspect as mentioned for the first aspect.

BRIEF DESCRIPTION OF THE DRAWINGS

Embodiments of the invention will be described, by way of example only, with reference to the drawings, in which.

DESCRIPTION OF EMBODIMENTS

Figure 1:
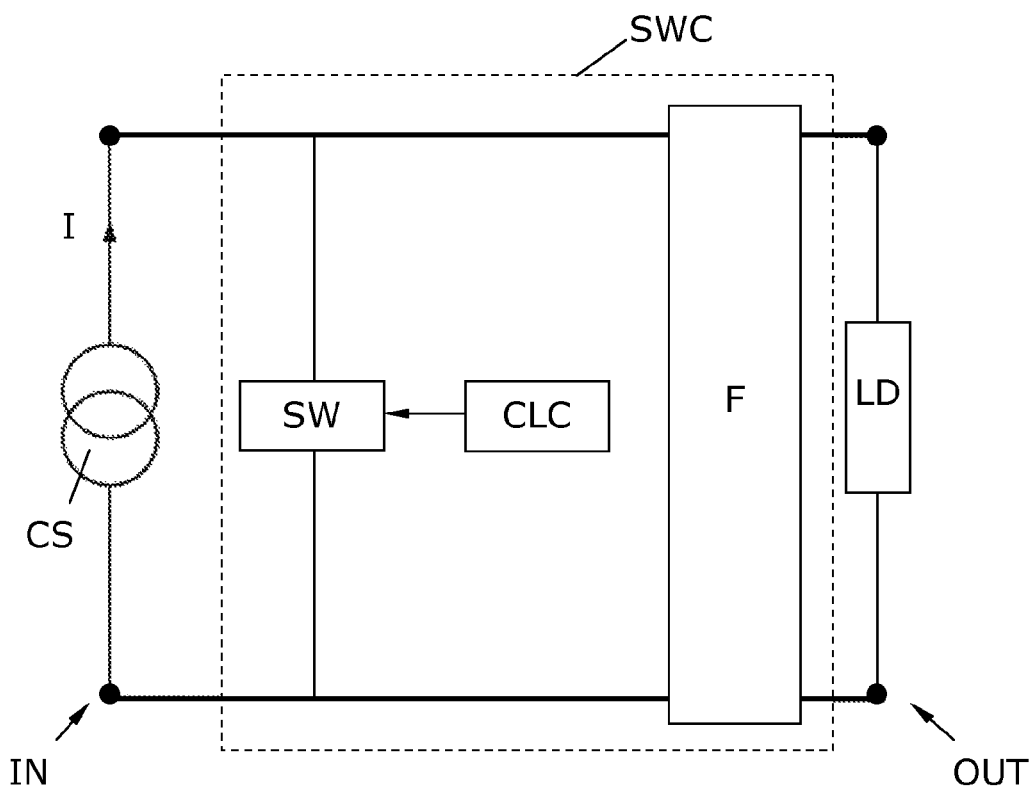
FIG. 1 illustrates in schematic form an electric power converter circuit embodiment.

FIG. 1 shows in schematic form the electric power converter circuit of an embodiment. The circuit is based on a current driven switching circuit SWC connected between input terminals IN and output terminals OUT. An electric source in the form of a current source CS is connected to the input terminals IN and inputs a current I to the switching circuit SWC, and a load LD is shown connected to the output terminals OUT.

The switching circuit SWC includes a switch arrangement SW with two or more electric switches which are turned "on" or "off" in accordance with a control signal from a control circuit CLC, preferably the electric switches are individually controllable. The control circuit CLC may be arranged to control the switch arrangement SW according to any known switching period or switching cycle which is determined according to a known switching scheme such as PWM, PDM, etc. at a predetermined switching frequency, such as 100 kHz to 1 MHz. The current source CS may be a solar cell and thus provide a DC current input I, and the switching circuit SWC may in such case be designed as a DC-to-DC or DC-to-AC converter. A low pass filter F serves to low pass filter the output from the switch arrangement SW, and the low pass filter F comprises at least a capacitor and an inductor. The switch arrangement SW and the low pass filter F are designed such that a high impedance seen from the output terminals OUT is obtained, in a frequency range below the switching frequency of the switch arrangement SW. As will be explained later, the filter components required for relevant embodiments will have a reduced volume compared to filter components required for a similar voltage controlled topology.

The current driven switching circuit SWC can be provided in different configurations as the ones also known from voltage driven converters: e.g. buck, boost, half bridge, full bridge etc. of which two or four individually controllable electric switches are required. Only a few specific examples are shown in FIGS. 2-5.

Further, the switch arrangement SW is connected and controlled by the control circuit CLC so as to directly short-circuit the input terminals IN during a part of a switching period. This can be obtained by one or more electric switches being connected in a series connection across the input terminals IN so as to allow direct short-circuiting of the input terminals IN in a part of the switching period or switching cycle. This means that the current source CS connected to the input terminals IN is actually short-circuited during a part of a switching period, thus delivering no energy in these periods, whereas the energy is drawn from the current source CS in other periods of the switching period. Hereby a switching circuit SWC can be designed which provides a high efficient conversion of energy from a current source, e.g. a solar cell. However in case of a pure voltage source, such configuration providing a temporary short-circuiting will provide a rather poor conversion efficiency.

To implement the switching circuit SWC, additional electric circuit elements are also required, namely a control circuit CLC, here only illustrated as one box for simplicity, since the implementation of the control circuit CLC will be known by the skilled person provided with the special requirements described in the present application.

The electric switches of the switch arrangement SW is preferably implemented with a normally-on-device, i.e. a switch device which is "on" or closed without any control signal. Especially a JFET transistor type is suitable for current driven switching circuit designs due to the fact that this transistor type does not have a built-in diode which in current driven designs is a significant disadvantage with the commonly used MOSFET transistors.

In the following, FIGS. 2-5 show different topologies, i.e. different connections of electric switches and low pass filter components.

Figure 2:
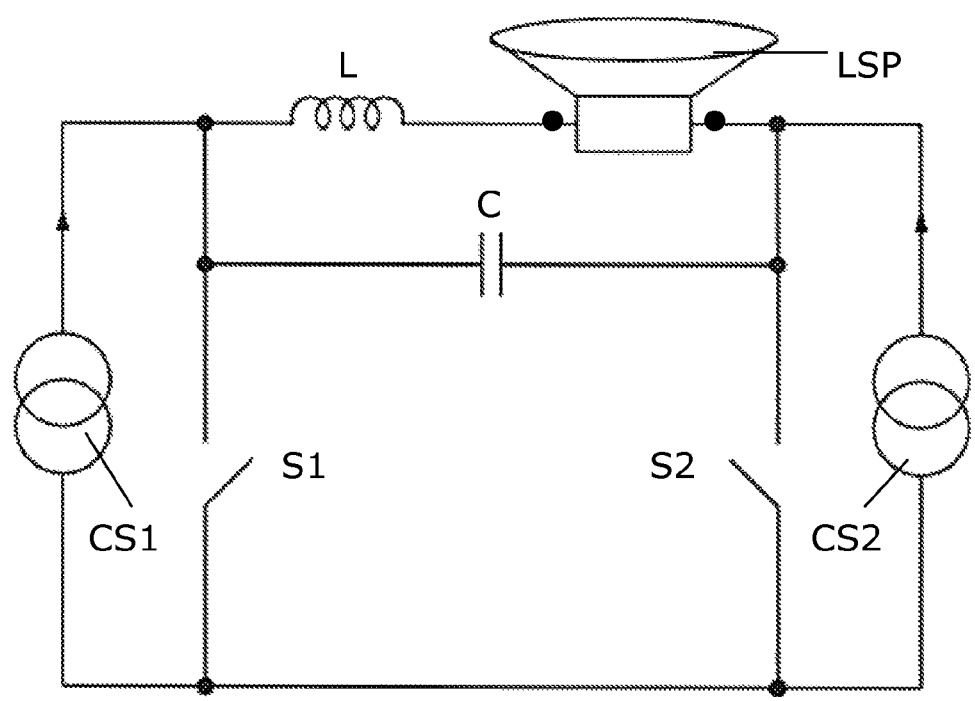
FIGS. 2-5 illustrate different current driven switching circuit embodiments.

FIG. 2 illustrates a specific switching power stage design example, namely a half bridge buck configuration. This configuration has two sets of input terminals at which respective current sources CS1, CS2 are connected. A loudspeaker LSP is here illustrated connected to the output terminals as an example of a load, it is understood that the configuration may as well be used also to drive other types of loads. Two independently controlled electric switches S1, S2, e.g. implemented as JFETs, are connected across the respective input terminals and thus short-circuit the respective current sources CS1, CS2 in the "on" periods during a switching period or cycle. An output filter is formed by an inductor L in series with the output terminals, and a capacitor C is connected between respective first terminals of each set of input terminals. Seen from the output terminals, i.e. seen from the loudspeaker LSP, a high impedance is provided at the output of the converter.

When either one of the switches S1, S2 is "on", the current from the source CS1, CS2 parallel to this switch S1, S2, is flowing through the output filter L, C and the load LSP. By turning the other switch S1, S2 "off", the opposite polarity of current can be applied to the same circuit. Preferably, the switches S1, S2 are controlled such that they are not turned "off" simultaneously.

Figure 3:
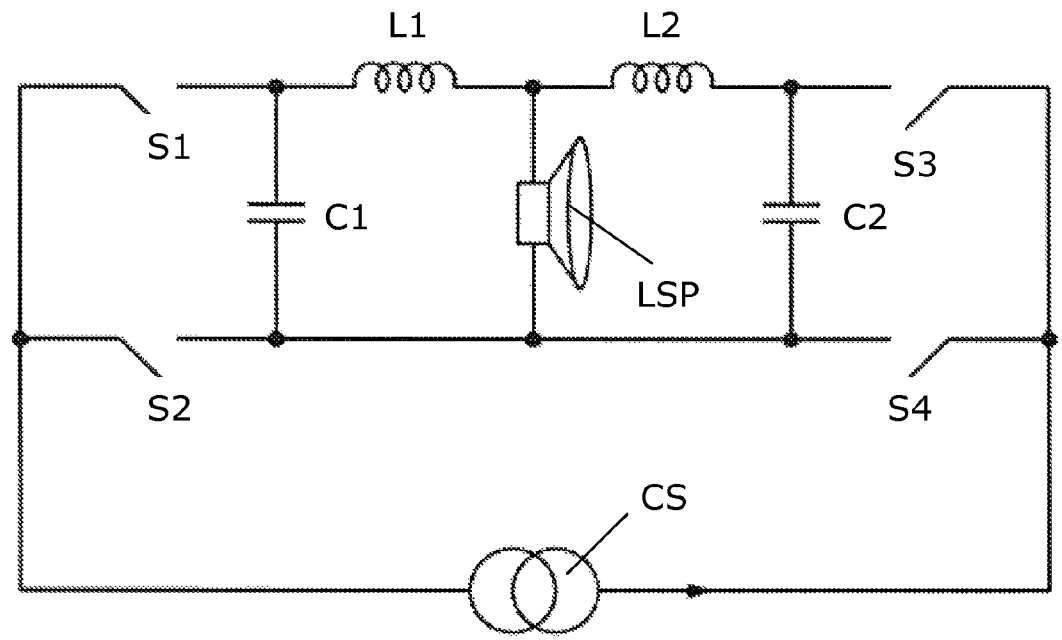

FIG. 3 illustrates another configuration example which also allows for both signal polarities through the load, namely a current driven full bridge buch configuration. Again a loudspeaker LSP is shown as an example of a load connected to the output terminals. Only one current source CS is required and is shown connected to the input terminals, but the full bridge configuration requires four controllable electric switches S1, S2, S3, and S4. One conduction path for the first polarity of load current is when switches S1 and S4 are "on". Accordingly, the other polarity of load current is when switches S2 and S3 are "on". All four switches S1, S2, S3, S4 may be "on" simultaneously, however turning them all "off" at the same time is not desired. Additionally, the configuration can be operated in a manner that no signal is delivered to the load by either turning "on" S1 and S3 or S2 and S4 simultaneously. Again, the source CS is short-circuited in a part of a switching cycle, namely when S2 and S4 are both turned "on".

A double set of filter components, i.e. inductors and capacitors L1, L2, C1, C2, are required compared to the embodiment of FIG. 2. However, it is to be understood that the two inductors L1, L2 may alternatively be replaced by one inductor in series with the load LSP.

Both configurations of FIGS. 2 and 3 allow load currents up to the current provided by the current sources CS, CS1, CS2. When controlled in an "on"/"off" manner, the average current through the load is proportional to the "off"-times of the switches.

Figure 4:
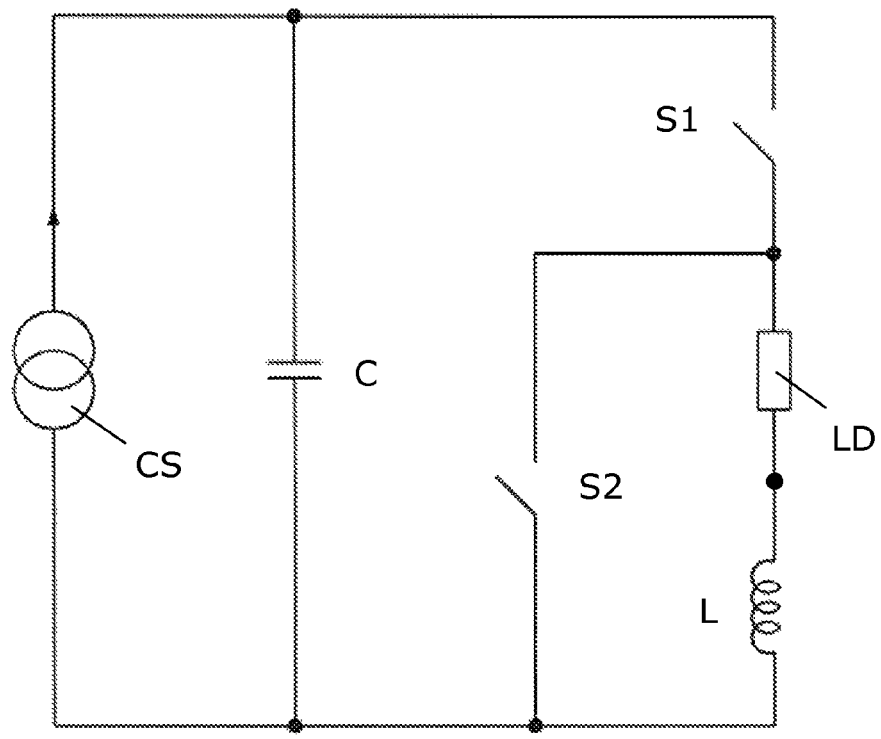

FIG. 4 shows yet another embodiment, namely a current driven half bridge boost configuration. This configuration requires only a single current source CS, two switches S1, S2, and a single set of inductor L and capacitor C. Then S1 is "off", the capacitor C is charged from the current source CS. During this time, switch S2 is preferably "on" so as to provide a freewheeling path for the inductor L. Turning S1 "on" provides now both: the current from the current source CS as well as the charges from the capacitor C to the series configuration of load LD and inductor L as soon as switch S2 is turned "off". Through this operation, the current flowing through the load LD is equal to or higher than the current of the current source CS. Both switches S1, S2 are preferably turned "off" simultaneously.

As the current through the load LD can only be equal to or greater than the current from the source CS in the half bridge configuration, a circuit is desirable which can provide also lower currents than the source current through the load LD.

Figure 5:
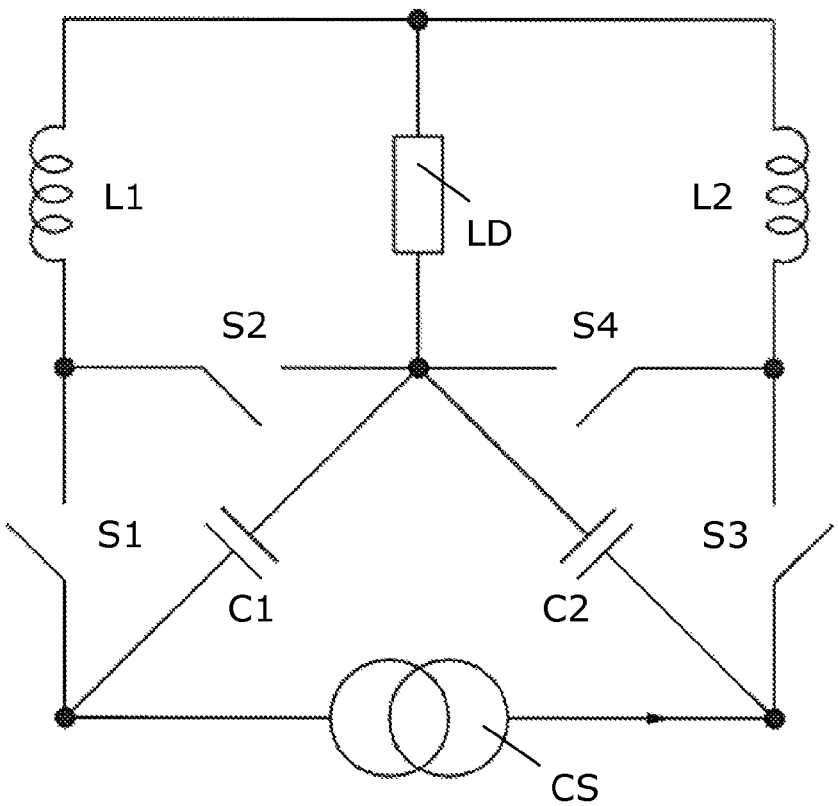

FIG. 5 shows a full bridge current driven boost configuration which provides such lower current than the source current. This configuration requires four switches S1, S2, S3, and S4 as well as two sets of filter components L1, L2, C1, C2 but only one current source CS to deliver a current to the load LD. As with the embodiment of FIG. 3 it is to be understood that the two inductors L1, L2 could be replaced by one inductor in series with the load LD.

The two switch pairs S1, S2 and S3, S4 are preferably "off" simultaneously. However, both of these pairs can be operated independent or correlated. Turning S1 "off" (or S3 respectively), allow charging the capacitor C1 or C2 connected to the respective switch from the current source CS. During this period the according inductor L1, L2 load LD path can freewheel through S2 (or S4 respectively). Turning S1 "on" (or S3 respectively), and turning S2 "off" (or S4 respectively) allows both: the current from the source CS as well as the stored charges in the capacitor C1, C2 to flow through the load LD. AS the stored energy in the capacitors C1, C2 are of opposite polarity, the output current polarity can be controlled in either direction.

Figure 6:
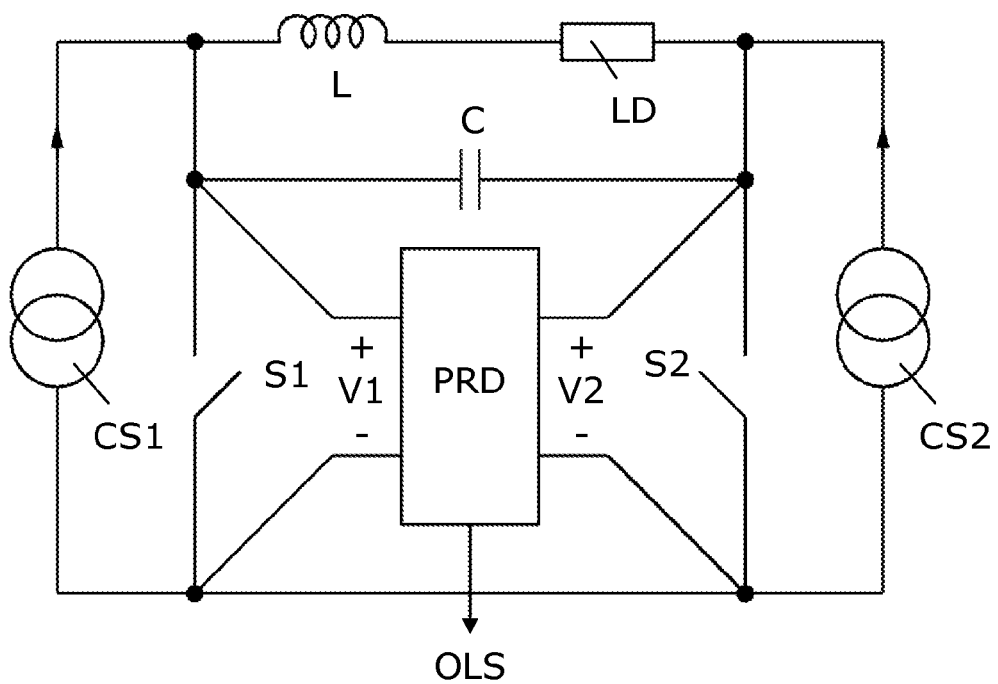
FIG. 6 illustrates in schematic form an overload protection detector for a current driven switching circuit based on simple voltage detection.

FIG. 6 illustrates the principle of an overload protection detector PRD which is significantly facilitated in current driven switching circuits compared to voltage driven designs. The circuit example is the same as shown in FIG. 2, i.e. the half bridge buck configuration. The protection detector PRD senses the voltages V1, V2 across the respective switches S1, S2 and generated an overload signal OLS in case an overload is detected. This signal OLS can then be used to activate an overload action, e.g. a shut down or the like, in order to protect the switches S1, S2. In the current driven design, it is possible to detect an overload situation by merely detecting if the voltages V1, V2 across the switches S1, S2 exceeds a predetermined value. This is preferably implemented with simple comparator circuits made by standard operational amplifiers, and thus a simple and reliable protection detection can be provided compared to voltage driven designs requiring sensing of currents to detect an overload situation.

Figure 7:
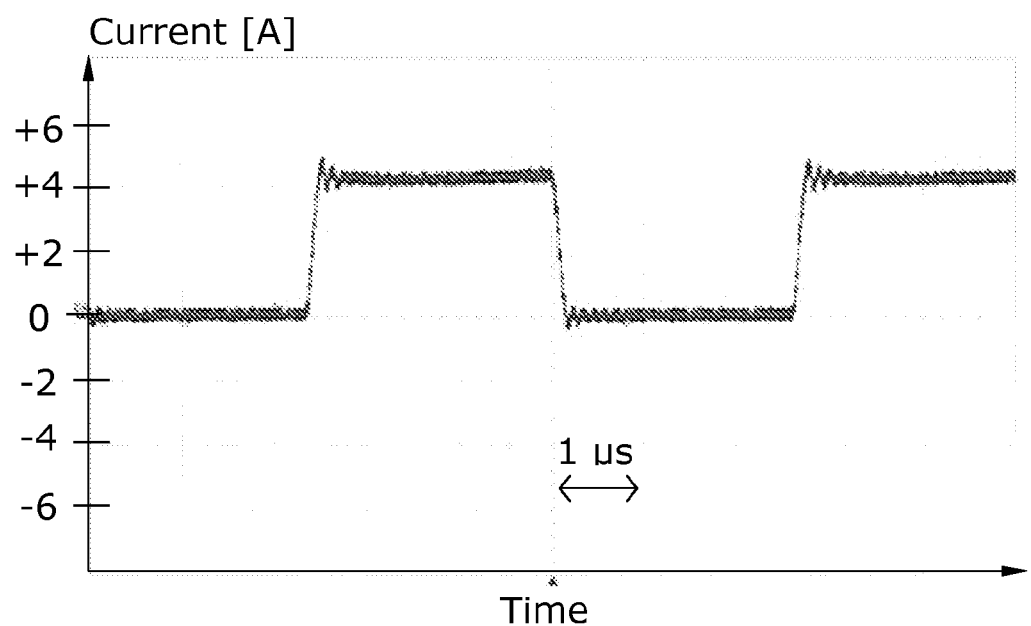
FIG. 7 shows measured current through one switch of a prototype of a power stage of the half bridge buck configuration as shown in FIG. 2, FIGS. 8a and 8b illustrate the dimensions of inductor and capacitor required to implement respective voltage driven (FIG. 8a) and current driven (FIG. 8b) power stages of a class D audio amplifier of equal output power.

FIG. 7 shows measured current through one of the switches S1, S2 in a prototype of the circuit shown in FIG. 2, i.e. a half bridge buck converter configuration. The switch was in the prototype implemented as a MOSFET, and the switching frequency was approximately 200 kHz. As seen, it is possible to obtain a current switching which in the recorded oscilloscope photo is close to an ideal rectangular form.

Figures 8A, 8B:
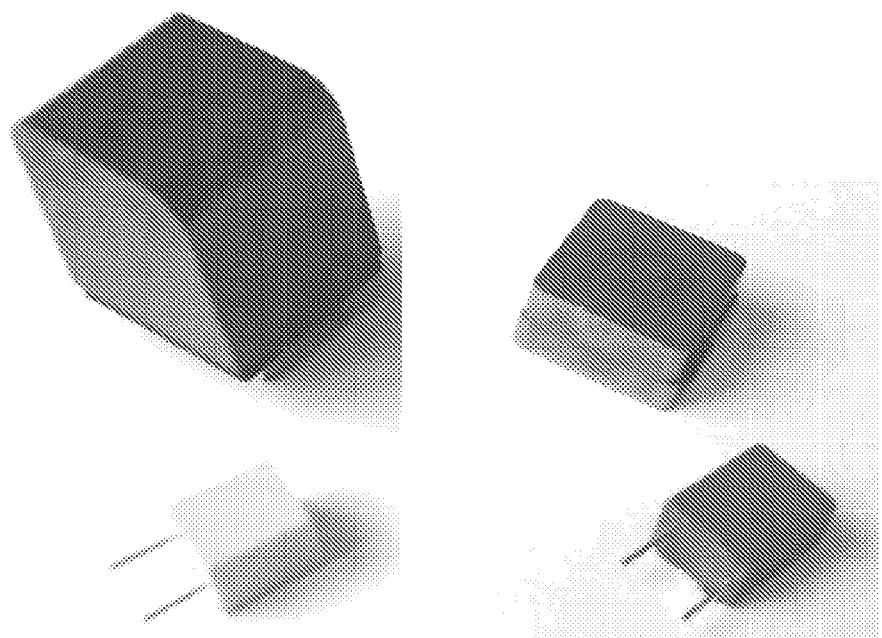

FIGS. 8a and 8b show typical component dimension of the filter components required for a half bridge converter circuit when implemented in a voltage driven design (FIG. 8a), and in a current driven design (FIG. 8b) for class D audio amplifier with a power output of 100 W. In the voltage driven case, the inductor value is 20 µH versus 7.5 pH for the current driven case. As seen, the inductors (the upper components in both of FIGS. 8a and 8b) has a considerably different size, whereas the capacitors (470 nF and 1.25 µF, respectively) are of comparable size. Thus, for the calculated audio amplifier example, the difference in total value of the required filter components is a factor of 6. Even though this difference is merely an example, the current driven design will in many cases result in circuits where the required inductor can be reduced in inductance, and thus be implemented with a component having a smaller size. This is important in many devices and thus allows e.g. for very compact audio amplifier designs using the current driven topology. Hereby very compact audio devices such as portable audio devices in the form of hearing aid, head sets, mobile phones etc. of miniature size is facilitated.

Figure 9:
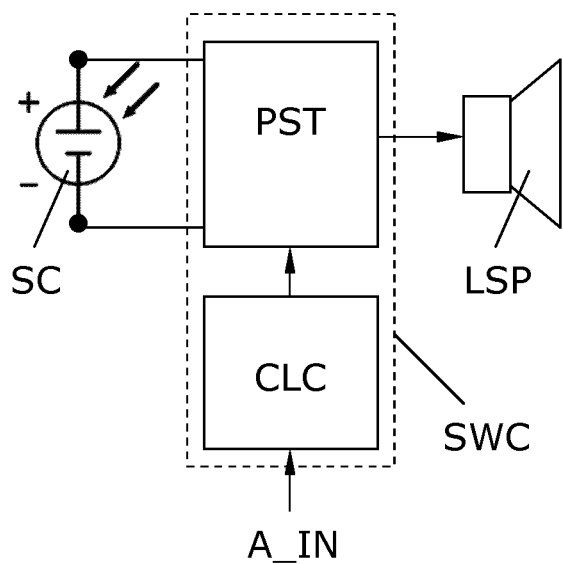
FIG. 9 illustrates in a block diagram form an audio device with a power amplifier powered by a solar cell.

FIG. 9 shows a specific example of an audio device comprising a solar cell SC as current source to power a current driven switching circuit SWC including a power stage PST controlled by a control circuit CLC which also receives an audio input signal A_IN. The control circuit CLC may operate the power stage PST according to a PWM scheme. The power stage drives a loudspeaker LSP, and preferably the switching circuit SWC is configured as a current to current converter.

The invention allow such audio device to be both compact with respect to the size of the power stage PST, and due to a high current to current conversion efficiency, the power from the solar cell SC is efficiently utilized, and thus the size of the solar cell SC can be limited compared to other power stages PST, and still provide the same acoustic output from the loudspeaker LSP.

To sum up, the invention provides a device comprising an electric power converter circuit for converting electric energy. The converter circuit comprises a switch arrangement with two or more controllable electric switches connected in a switching configuration and controlled so as to provide a current drive of electric energy from an associated electric source connected to a set of input terminals. This is obtained by the electric switches being connected and controlled to short-circuit the input terminals during a part of a switching period. Further, a low pass filter with a capacitor and an inductor are provided to low pass the output from the switch arrangement and designed such that a high impedance at a frequency range below the switching frequency is obtained, seen from the output terminals. Switches implemented by normally-on-devices are preferred, e.g. in the form of a JFET. The converter circuit may be in different configurations such as half bridge buck, full bridge buck, half bridge boost, or full bridge boost. A current driven conversion is advantageous for high efficient energy conversion from current sources such as solar cells or where a voltage source is connected through long cables, e.g. powerline cables for long distance transmission of electric energy. In many applications the total size of filter components (capacitors and inductors) can be reduced compared to voltage driven topologies. One application is an audio amplifier arranged to drive a loudspeaker.

Although the present invention has been described in connection with preferred embodiments, it is not intended to be limited to the specific form set forth herein. Rather, the scope of the present invention is limited only by the accompanying claims.

In this section, certain specific details of the disclosed embodiments are set forth for purposes of explanation rather than limitation, so as to provide a clear and thorough understanding of the present invention. However, it should be understood readily by those skilled in this art, that the present invention may be practiced in other embodiments which do not conform exactly to the details set forth herein, without departing significantly from the spirit and scope of this disclosure. Further, in this context, and for the purposes of brevity and clarity, detailed descriptions of well-known device, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. A device comprising an electric power converter circuit arranged to convert electric energy between a set of input terminals and a set of output terminals in a single power stage, comprising:
   a switch arrangement comprising at least first and second controllable electric switches connected so as to allow direct short-circuiting of the input terminals,
   a control circuit arranged to control the switch arrangement according to a switching scheme with a switching frequency, wherein the control circuit is arranged to turn on the first and second electric switches so as to directly short-circuit the input terminals during a part of a switching period, and
   a low pass filter comprising at least a capacitor and an inductor arranged to low pass filter an output from the switch arrangement and connected so as to provide a high output impedance at a frequency range below the switching frequency;

wherein the electric power converter is configured to provide a current-to-voltage conversion or a current-to-current conversion between the input terminals and the output terminals.

2. The device according to claim 1, wherein the electric power converter circuit is arranged to provide a low impedance seen from the input terminals at a frequency range below the switching frequency.

3. The device according to claim 1, wherein the first and second electric switches are arranged to provide a bi-directional voltage blocking.

4. The device according to claim 1, wherein the first and second electric switches are connected in series across the input terminals, and wherein the control circuit is arranged to turn on both of the first and second electric switches simultaneously, so as to directly short-circuit the input terminals in a part of the switching period.

5. The device according to claim 1, wherein the inductor of the low pass filter is arranged so in relation to the output terminals to be in series connection with the associated load upon connection of said load to the output terminals.

6. The device according to claim 1, wherein the control circuit is arranged to operate the switch arrangement so as to convert a current level at the input terminals into a current level at the output terminals which is higher than said current level at the input terminals.

7. The device according to claim 1, wherein the control circuit is arranged to operate the switch arrangement so as to convert a voltage level at the input terminals into a voltage level at the output terminals which is higher than said voltage level at the input terminals.

8. The device according to claim 1, wherein the electric power converter circuit comprises two sets of input terminals arranged for connection of respective associated electric sources.

9. The device according to claim 8, wherein the switch arrangement comprises, for each of the two sets of input terminals, at least one electric switch connected so as to allow direct short-circuiting of the set of input terminals.

10. The device according to claim 1, wherein at least one of the controllable electric switches comprises a transistor being one of: a Junction Field Effect Transistor, a Metal-Oxide-Semiconductor Field Effect Transistor, a Modulation-doped Field Effect Transistor, a Metal-Semiconductor Field Effect Transistor, a Bipolar Junction Transistor, an Insulated Gate Bipolar junction Transistor, or a triac.

11. The device according to claim 10, wherein the transistor is a normally-on-device.

12. The device according to claim 1, wherein the switching configuration is a topology being analogue to one of: half bridge or full bridge buck, half bridge or full bridge boost, flyback, two-switch flyback, push-pull, Single-Ended Primary-Inductor Converter, or Cuk converter.

13. The device according to claim 1, wherein the switching scheme is one of: Pulse Width Modulation, Pulse Density Modulation, Pulse Code Modulation, Frequency Modulation, or Phase Modulation.

14. The device according to claim 1, comprising a current source connected to the input terminals.

15. The device according to claim 14, wherein the current source comprises one of: a solar cell, a re-chargeable electric energy source, or an electric powerline.

16. The device according to claim 1, comprising an overload protection detector arranged to detect an overload of at least one element of the electric power converter circuit, and to generate an overload signal accordingly.

17. The device according to claim 16, wherein the overload protection detector comprises a circuit arranged to detect a voltage across at least one of the electric switches of the switch arrangement, and to generate the overload signal accordingly.

18. The device according to claim 1, the device being one of: a switch-mode power supply, an audio device, an audio amplifier, a DC-DC converter, a DC-AC converter, an AC-DC converter, a solar cell converter, a Light Emitting Diode driver, a battery charger, a backlight converter, or a point of load converter.

19. A method for converting electric energy between a set of input terminals and a set of output terminals in a single power stage, the method comprising:
- providing a switch arrangement comprising first and second controllable electric switches connected so as to allow direct short-circuiting of the input signals,
- switching the switch arrangement according to a switching scheme with a switching frequency so as to directly short-circuit the input terminals during a part of a switching period, and
- low pass filtering an output from the switch arrangement by means of at least a capacitor and an inductor arranged so as to provide a high output impedance at a frequency range below the switching frequency;
- wherein the method is configured to provide a current-to-voltage conversion or a current-to-current conversion between the input terminals and the output terminals.

* * * * *